United States Patent [19]

Nesher et al.

[11] 4,096,644
[45] Jun. 27, 1978

[54] EDUCATIONAL AID

[76] Inventors: Dan Nesher, 7 Soroka St., Haifa; Yigael Zemer, 5, Koreh Hadorot, Jerusalem, both of Israel

[21] Appl. No.: 694,405

[22] Filed: Jun. 9, 1976

[30] Foreign Application Priority Data

Feb. 18, 1976 Israel .................................. 49058

[51] Int. Cl.² ........................................... G09B 19/02
[52] U.S. Cl. ..................................... 35/31 R; 35/28.3
[58] Field of Search ..................... 35/28.3, 28.5, 31 R, 35/31 G, 31 D

[56] References Cited

U.S. PATENT DOCUMENTS

| | | | |
|---|---|---|---|
| 2,672,344 | 3/1954 | Wakefield | 35/28.5 |
| 2,916,833 | 12/1959 | Di Salvo | 35/28.3 |
| 3,204,343 | 9/1965 | Pollock | 35/31 G |
| 3,410,002 | 11/1968 | Mulholland et al. | 35/31 R |
| 3,452,454 | 7/1969 | Easton et al. | 35/31 R |
| 3,722,109 | 3/1973 | Jacobson | 35/28.5 |

*Primary Examiner*—William H. Grieb
*Attorney, Agent, or Firm*—Geoffrey R. Myers

[57] ABSTRACT

An educational aid for teaching the concept of primary factors of numbers, multiplication, division, facturing and the like, based on the isomorphic adaptation of basic colors to primary numbers each being represented by a certain basic color and composite numbers by fields of color being obtained by mixing the corresponding basic colors in unit quantities according to the factors making up said composite number, so that given a certain field of color corresponding to a composite number, the student can match said field by the correct mixture of said basic colors and thereby find the factors of the number represented by said field, or conversely the student can mix certain basic colors in unit quantities and match the resulting color with a field of color and thereby learn multiplication. The number 1 is represented by a colorless transparent material, and the number 0 by a piece of opaque black material.

6 Claims, 1 Drawing Figure

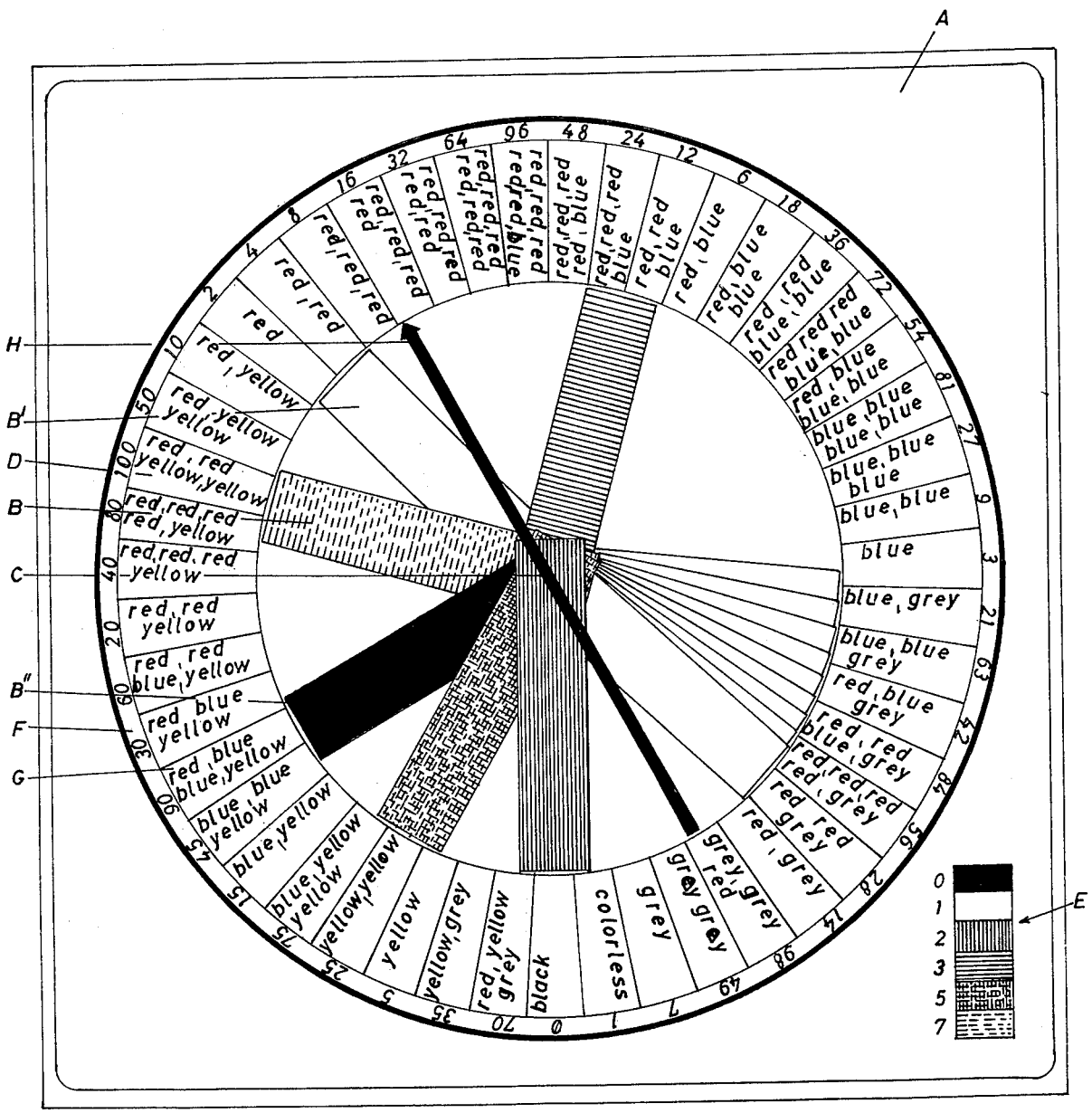

EDUCATIONAL AID

The present invention concerns an educational aid of the kind used to teach the concept of primary factors of numbers, multiplication, division, factoring and the like. For the purpose of the present invention, such an educational aid will hereinafter be called an educational aid of the kind defined.

The invention is based on the isomorphic adaptation of basic colors to primary numbers and consists in an educational aid of the kind defined, wherein a plurality of primary numbers are each represented by a certain basic color and composite numbers by fields of color being obtained by mixing the corresponding basic colors in unit quantities according to the factors making up said composite number, so that given a certain field of color corresponding to a composite number, the student can match said field by the correct mixture of said basic colors and thereby find the factors of the number represented by said field, or conversely the student can mix quantities and match the resulting color with a field of color and thereby learn multiplication.

In a preferred embodiment of the invention, each primary number is represented by a piece of transparent material of a certain color, the number 1 being represented by a piece of colorless transparent material, while the number 0 is represented by a piece of opaque material which is preferably black. The material may be paper, parhcment, plastics, glass, prisms, or the like.

The fields of color may be arranged in rows and/or columns on a board, the basic colors being pieces of any suitable shape.

In a further preferred embodiment of the invention, the fields of color may be arranged in the form of a color wheel, the basic colors being in the form of superposed strips in a desirable quantity and rotatably mounted in the center of said wheel.

If desired, the educational aid according to the invention may be made in the form of a game having a color wheel in the center of which colored strips and a pointer are rotatably mounted.

An embodiment of the present invention showing an educational aid incorporating the primary numbers up to 10 and the composite numbers up to 100 is shown in plan view by way of example only in the accompanying drawing.

On a board A a plurality of transparent strips B are rotatably mounted at the center C of a circle. The strips B are made of thin transparent plastics of a color corresponding to the primary numbers up to 10, strip B' being colorless and corresponding to 1, while strip B" is black opaque, the color code E of the basic colors used here being shown on the right bottom corner of the board A. Although the basic colors cannot be distinguished in the example shown, there are six red strips which represent the number 2, four blue strips which represent the number 3, two yellow strips representing the number 5 and two grey strips representing the number 7. It is, of course, understood that any other color selection is possible. An annular band F is provided around circle D and is divided into radially extending fields G of a number corresponding to the composite numbers up to 100 and the numbers of the code E, the number which each field represents being shown adjacent each field at the circumference of circle D. Each field G is of a color which is a result of superposing transparent colored pieces according to code E and the factors of the particular number. Thus, taking at random the number 28 its field G has a dirty red color being composed of two red and one grey piece. By rotating the proper strips B to be in superposed position, any color of fields G can be matched, the number of strips B and their individual colors corresponding to the primary factors of the number of the particular field.

The educational aid above described may be used as a game. For example, dice may be provided and according to the number he throws, the player has to find the field corresponding to the multiplication of the number of the dice. Or, cards bearing numbers may be provided and the player has to find the factors of the number he happens to draw. Or still, a pointer H may be rotatably mounted at C and when it stops after a player has rotated it, the number it points to has to be factored. It can be seen, that numerous games and rules therefor can be devised to use the educational aid according to the invention.

While a practical embodiment of the invention uses transparent plastic strips as here described, strips of paper, parchment, glass, prisms, or the like may also be used.

It is also within the scope of the present invention to use units of liquid or solid color pigments to represent the primary numbers, the composite numbers being a mixture of these. Thus, for example, bottles or vials of basic liquid colors may be provided together with identical medicine droppers by means of which unit quantities e.g. one or two drops may be extracted from said bottles and may be mixed according to the multiplication of the primary numbers desired. The number 1 is herein represented by a colorless liquid, e.g. water, while the number 0 is represented by black India ink, for example. It is possible also for the purpose of demonstration, to house the liquid colors representing the primary numbers in burettes and to dispense equal quantities therefrom.

We claim:

1. An educational aid comprising a plurality of transparent means each representing a certain basic color and a board on which a plurality of primary numbers are each represented by a different one of said certain basic colors the transparent means being movably attached in spaced relationship to said board in a manner such that they may be selectively brought into overlying relationship, one with another thereby to obtain a composite number by fields of color the corresponding basic colors being in unit quantities according to the factors making up said composite number, so that given a certain field of color corresponding to a composite number, the student can match said field by the correct mixture of said means having basic colors and thereby find the factors of the number represented by said field, or conversely the student can mix said means having said certain basic colors in unit quantities and match the resulting color with a field of color and thereby learn multiplicaiton.

2. An educational aid, according to claim 1, wherein the number 1 is represented by a piece of colorless transparent material, while the number 0 is represented by a piece of opaque material which is preferably black.

3. An educational aid according to claim 1, wherein the said means is paper, parchment, plastics, glass or prisms.

4. An educational aid according to claim 1, wherein the fields of colors are arranged in rows and/or columns on a board, the basic colors being pieces of any suitable shape.

5. An educational aid according to claim 1, wherein the fields of color are arranged in the form of a color wheel, the basic colors being in the form of superposed strips in a desireable quantity and rotatably mounted in the center of said wheel.

6. An educational aid according to claim 5 in the form of a game having a pointer rotatably mounted in the center of said wheel.

* * * * *